March 28, 1944.　　　J. BROWN　　　2,345,321
BEARING FOR ROLLING MILLS, MIXERS, AND CALENDERS
Filed Jan. 20, 1943　　　2 Sheets-Sheet 1
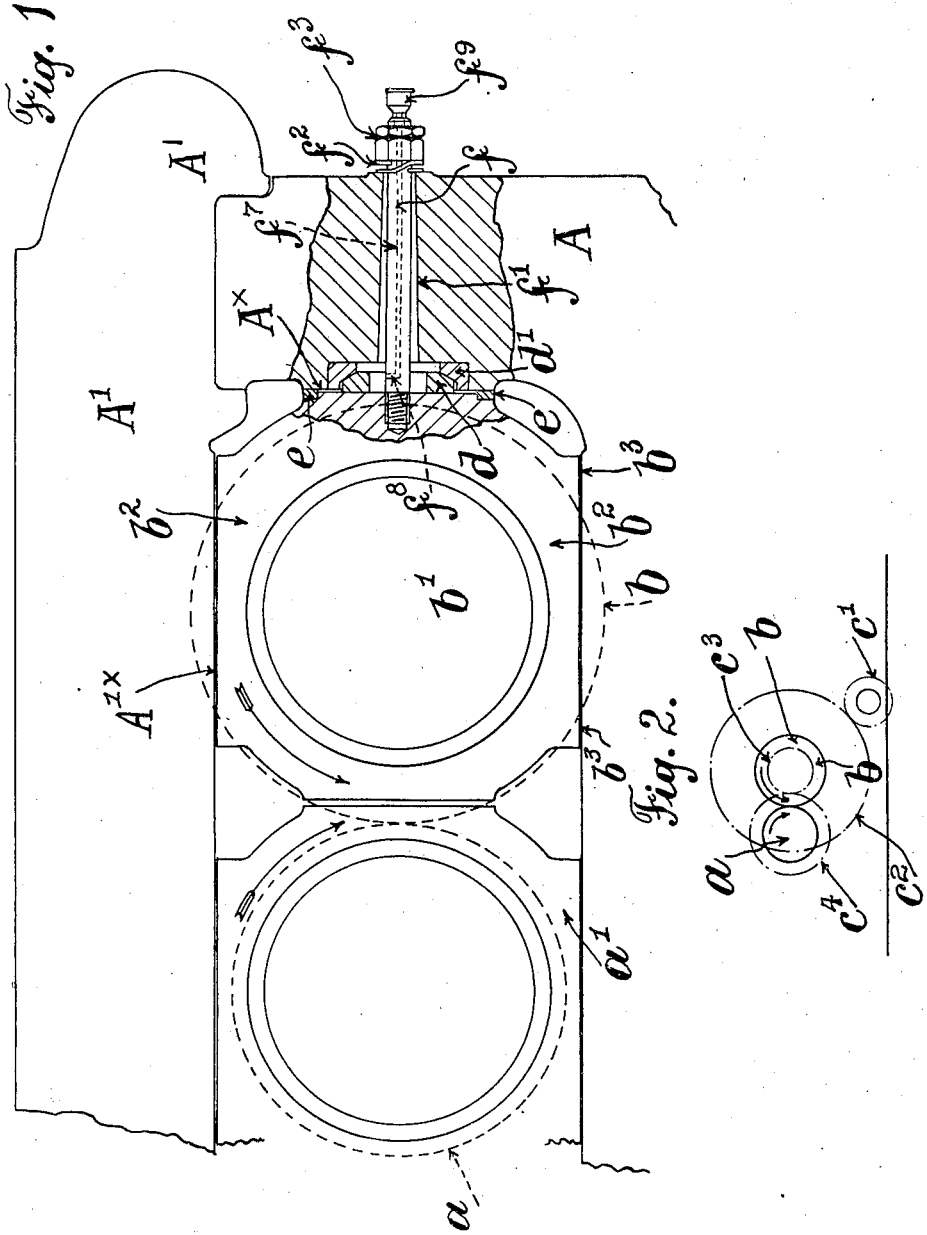
Inventor
JOSEPH BROWN
BY: Francis E. Bryce
ATTORNEY.

March 28, 1944.   J. BROWN   2,345,321
BEARING FOR ROLLING MILLS, MIXERS, AND CALENDERS
Filed Jan. 20, 1943   2 Sheets-Sheet 2
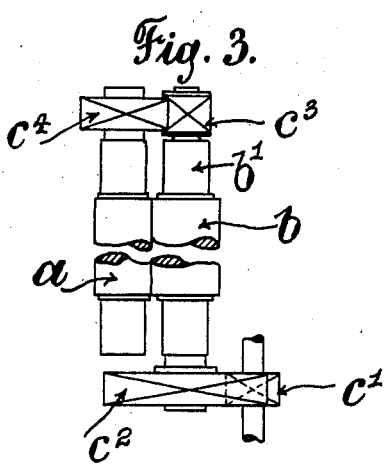
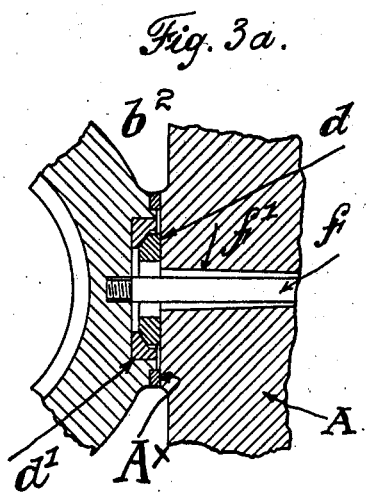
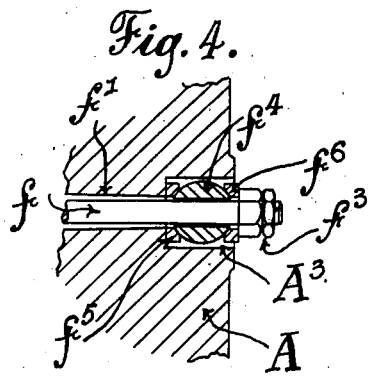
Inventor
JOSEPH BROWN
BY: Francis E. Boyce
ATTORNEY.

Patented Mar. 28, 1944

2,345,321

UNITED STATES PATENT OFFICE 2,345,321

BEARING FOR ROLLING MILLS, MIXERS, AND CALENDERS

Joseph Brown, Castleton, Rochdale, England, assignor to David Bridge & Company Limited, Castleton, Rochdale, England, a British company Application January 20, 1943, Serial No. 472,943
In Great Britain February 12, 1942

5 Claims. (Cl. 308—72)

The invention relates to improvements connected with the bearings of rolling mills, mixers, calenders, or like apparatus for breaking down, working or mixing or acting upon rubber or rubber mixtures, synthetic rubber, re-claimed rubber masses, linoleum masses, or plastics, wherein the mass or product is acted upon between powerful opposing or co-operating rollers which are driven by gearing and rotate in the direction of the nip.

The bearings and axles for one roller (for convenience here called the front roller in the case of a two roller machine), are free to move or have power of accommodation, but the bearing structures and brasses for the other roller (for convenience here called the back or anchored roller) have no power of accommodation.

It is found in practice that in passing unusually hard or heavy or uneven masses between the rollers (which are usually driven through powerful gearing one set from another) that, whilst the bearings for the front roller do not develop undue heat, the bearings for the back or anchored roller develop very considerable heat, and said bearings and the roller shafts wear rapidly and soon become unsatisfactory.

It is considered, that the excessive wear set-up with respect to the back or anchored roller in this class of apparatus is due to the fact that the bearing or supporting blocks with the brasses for said rollers have no power of accommodation, same being unable to adjust themselves either together or relatively. Therefore, according to these improvements, it is proposed to provide bearing blocks or structures for the back or the anchored rollers for the class of machine in question which shall have power of accommodation. Consequently, said bearing blocks or structures including brasses together with the rollers and shafts can make slight compensating movement to meet severe stresses at any particular time due to the passage of an unusually heavy or uneven load or hard mass or to deflection of the rollers.

Such being the purpose of the invention, the construction of the accommodating bearing blocks or structures can vary somewhat, as will be obvious; but same will in every case be of an order which permits a very slight rotary or angular or compensating movement thereof with power of recovery, the bearing blocks or structures being where required accommodatingly tied or anchored to the cheek or frame or part of the machine in manner to resist undue movement whilst permitting compensating movement and necessary retraction of the bearing blocks or structures.

Opposing curved or concave and convex surfaces or so-called spherical faced washers are used to permit of the desired accommodating movement of the bearing blocks or structures, and, accommodating tie-bolts.

The improvements are hereafter further described and with reference to the accompanying drawings, wherein:

Fig. 1 is a sectional side view showing the improvements as applied to a two roller machine.

Fig. 2 shows a diagrammatic end view indicating the rollers and typical gear for driving said rollers.

Fig. 3 is a diagrammatic plan view of the rollers and gear seen in Fig. 2.

Fig. 3a, illustrates a slight modification.

Fig. 4 shows a slight modification in the tie bolt arrangement.

Respecting the example to be described in detail with regard to Figs. 1 to 3a, there is shown by Fig. 1 a type of rolling mill or squeezer for rubber compounds, rubber waste, or such like, wherein two rollers $a$, $b$ co-operate, same being inter-geared and driven in known manner, for example through gears $c^1$, $c^2$, $c^3$, $c^4$, so that the rollers $a$, $b$ are power driven carrying down and acting on the mass passing the nip. The front roller $a$ is mounted in movable or accommodating bearing blocks or structures $a^1$ arranged and guided in known manner. With respect to the back roller $b$, this has its shafts $b^1$ mounted in bearing blocks or structures $b^2$ which rest on machined supports or bases $b^3$ in the end castings or frame-work A, easy fitting machined caps or castings $A^1$ providing the upper half of what are in effect slides for the bearing blocks or structures $b^2$. At the back or rear machined faces of each bearing block or structure $b^2$ is a curved or convex element properly combined or mounted and which may be of anti-friction metal, whilst in the cheek of the upright frame is a co-operating curved or concave element, said combining elements providing the surfaces which permit the slight relative or accommodating movement desired.

The bearing blocks or structures are in certain examples tied to the cheek or framework by bolts, the curved inter-engaging elements being fashioned for passage of the bolts.

As the tie bolts require to have slight power of accommodation, provision is made to that end.

In the example Fig. 1, there is a machined face as to the framework A in the rear of each bearing block or structure $b^2$, the latter being supported from below by a bearing face $b^3$ in the framework A and guided from above by the cap $A^1$, which cap $A^1$ is an easy fit, that is a small clearance exists between the top of each bearing block $b^2$, and machined under free $A^{1x}$ of the caps $A^1$ to permit slight angular movement. Between the cheek of the framework and the back of the bearing block or structure $b^2$, two dished or curved rings or large spherical faced washers $d$, $d^1$ are located and mounted, that marked $d^1$ being let into the cheek $A^x$ of the frame end A. The ring $d$ is applied at the back of the bearing block or structure $b^2$. These spherical faced rings or large spherical faced washers $d$ and $d^1$ are cut-away over the central area. The co-operating faces are convex and concave as already mentioned, and a felt or rubber ring or packing $e$ effects a closure between the bearing block or structure $b^2$ and the cheek or face $A^x$ of the upright casting A. The disposition of the spherical faced rings or washers $d$ and $d^1$ may be reversed, as is suggested by the Fig. 3a.

The end of a powerful horizontal tie bolt $f$ is screwed into the bearing block or structure $b^2$, and passes through a passageway $f^1$ shown conical as to bore in the cheek of upright casting A. Said bolt $f$ as to its outer end emerges at the rear of the upright casting A. A powerful spring $f^2$ is applied to the tie-bolt same being drawn up to resiliently anchor the bearing block or structure by means of locking nuts $f^3$. Alternatively, the bolt $f$ may pass through a bored metallic ball $f^4$ which combines with spherical faced washers $f^5$, $f^6$, let into a recess $A^3$ in the upright casting A. This arrangement is shown by the Fig. 4.

Such an arrangement allows a horizontal tie-bolt to accommodate itself along with the bearing block or structure.

To permit ready lubrication of the accommodating bearing elements $d$, $d^1$, that is the spherically faced washers adjacent the bearing blocks or structures $b^2$, the tie-bolts $f$ can be drilled longitudinally at $f^7$ to an offset outlet $f^8$, a lubricator $f^9$ being fitted at the outer end of the bolt $f$, as indicated at Fig. 1.

Similar acommodating spherical faced washers and intertying bolts are necessarily used with respect to each bearing block or structure for the back or anchored roller $b$.

I declare that what I claim is:

1. Accommodating means for the support of the bearing blocks of the back or anchored roller of apparatus of the character set forth, comprising an anchored roller, accommodating bearing blocks therefor, and framework, guiding surfaces in connection with the framework to guide the bearing blocks, co-operating spherical faced devices intermediate the said bearing blocks and the framework, said devices having a central disposition and focus of pressure to permit of angular and accommodating movement, tie-bolts passing centrally through said spherically faced devices, said framework having tapered holes fashioned therein wherein the tie-bolts are located, powerful springs on the outer ends of the tie-bolts, and adjustable lock-nuts to confine said springs, said tie-bolts anchoring the bearing blocks to the framework and confining the spherical faced devices, all to permit of slight angular and accommodating movement of the bearing blocks under extreme pressure and to restore same to normal position after said movement.

2. Accommodating means for the support of the bearing blocks of the anchored roller of apparatus of the character set forth, comprising an anchored roller, accommodating bearing blocks, and framework, guiding surfaces in the framework to guide the bearing blocks, said framework having circular cavities, spherical faced washers disposed in said cavities, and spherical faced devices in connection with the walls of said bearing blocks, said spherical faced washers and spherical faced devices having a central disposition and focus of pressure, tie-bolts passing through the spherical faced washers and spherical faced devices and the framework, said framework having tapered holes drilled therein for passage of the tie-bolts, powerful springs located on the outer ends of said tie-bolts, and lock-nuts to confine said springs, said tie-bolts anchoring the bearing blocks to the framework and confining the spherical faced washers and spherical faced devices, all to permit of slight angular and accommodating movement of the bearing blocks under extreme stresses and to restore same to normal position after said movement.

3. Accommodating means for the support of bearing blocks of the anchored roller of apparatus of the character set forth herein, comprising an anchored roller, accommodating bearing blocks, and framework, guiding surfaces in the framework to guide the bearing blocks, said bearing blocks having circular cavities, spherical faced washers disposed in said cavities, and co-operating spherical faced washers in connection with the framework, said spherical faced washers having a central disposition and focus of pressure, and the said framework having tapered passageways bored therein, tie-bolts passing through said bored passageways and the spherical faced washers and anchoring the bearing blocks to the framework, powerful springs located at the outer ends of said tie-bolts, and lock-nuts to confine said springs, all whereby the bearing blocks for the anchored roller are acommodatingly anchored and capable of slight angular movement.

4. Accommodating means for the support of the bearing blocks of apparatus of the character set forth and as claimed in claim 1, and further distinguished in that the tie-bolts are centrally drilled and have a lubricator at the outer extremity, all whereby lubricant can be imparted to the spherical faced devices, and provided packing ring confining said lubricant in the bearing structures.

5. Accommodating means for the support of the bearing blocks of apparatus of the character set forth herein and as claimed in claim 2, and further distinguished in that the tie-bolts for the bearing blocks have spherically faced washers and a metallic ball intermediate of said spherically faced washers, said washers and ball located at the rear of the framework, the same being confined on the tie-bolts by lock-nuts.

JOSEPH BROWN.